United States Patent
Khan et al.

(10) Patent No.: US 12,421,015 B1
(45) Date of Patent: *Sep. 23, 2025

(54) POWDER FLOW FEED SYSTEM

(71) Applicant: PRINCE MOHAMMAD BIN FAHD UNIVERSITY, Dhahran (SA)

(72) Inventors: Mushtaq Khan, Dhahran (SA); Muhammad Asad, Dhahran (SA); Muhammad Imran Khan, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/189,866

(22) Filed: Apr. 25, 2025

Related U.S. Application Data

(63) Continuation of application No. 19/040,619, filed on Jan. 29, 2025, now Pat. No. 12,330,857.

(51) Int. Cl.
| | |
|---|---|
| *B65D 83/06* | (2006.01) |
| *B22F 12/52* | (2021.01) |
| *B22F 12/55* | (2021.01) |
| *B22F 12/58* | (2021.01) |
| *B28B 13/02* | (2006.01) |

(Continued)

(52) U.S. Cl.
CPC .............. *B65D 83/06* (2013.01); *B22F 12/52* (2021.01); *B22F 12/55* (2021.01); *B22F 12/58* (2021.01); *B28B 13/022* (2013.01); *B29C 64/336* (2017.08); *B33Y 30/00* (2014.12)

(58) Field of Classification Search
CPC .......... B65D 83/06; B22F 12/52; B22F 12/55; B22F 12/58; B28B 13/022; B29C 64/336; B33Y 30/00
See application file for complete search history.

(56) References Cited

U.S. PATENT DOCUMENTS

| | | |
|---|---|---|
| 7,045,738 B1 | 5/2006 | Kovacevic |
| 10,786,870 B2 | 9/2020 | Miyano et al. |

(Continued)

FOREIGN PATENT DOCUMENTS

| | | |
|---|---|---|
| CN | 207222942 U | 4/2018 |
| CN | 211360652 U | 8/2020 |

(Continued)

*Primary Examiner* — Frederick C Nicolas
(74) *Attorney, Agent, or Firm* — Oblon, McClelland, Maier & Neustadt, L.L.P.

(57) ABSTRACT

A feeder system includes a donut-ring-shaped first wheel having a first groove recessed below its top surface, with a first hopper positioned above to receive material. A first conduit connects the hopper bottom to the groove, defining a feeding path. A mixer unit receives materials, connected to the first groove via a first suction head. A first motor rotates the first wheel, transferring material from hopper to groove to mixer unit. A donut-ring-shaped second wheel includes a second groove, second hopper, and second conduit. A second suction head connects this groove to the mixer unit, while a second motor enables wheel rotation for material transfer. The mixer unit combines both materials. The feeder system implements coaxial wheel arrangement with independent material flow control, enabling independent powder delivery for additive manufacturing applications.

20 Claims, 8 Drawing Sheets

(51) Int. Cl.
  *B29C 64/336* (2017.01)
  *B33Y 30/00* (2015.01)

(56) References Cited

U.S. PATENT DOCUMENTS

| | | | |
|---|---|---|---|
| 11,993,020 B2 | 5/2024 | MacDonald | |
| 12,330,857 B1 * | 6/2025 | Khan | ................. B22F 12/52 |
| 2005/0280185 A1 | 12/2005 | Russell | |

FOREIGN PATENT DOCUMENTS

| | | |
|---|---|---|
| CN | 112157259 B | 7/2022 |
| CN | 217941858 U | 12/2022 |

* cited by examiner

POWDER FLOW FEED SYSTEM

CROSS-REFERENCE TO RELATED APPLICATIONS

The present application is a Continuation of U.S. application Ser. No. 19/040,619, now allowed, having a filing date of Jan. 29, 2025.

BACKGROUND

Technical Field

The present disclosure is directed generally to powder feeding systems, and more particularly to a coaxial multi-disc powder feeder system for controlling powder flow rates and composition in real time during powder-based additive manufacturing processes such as Laser Direct Energy Deposition (LDED).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Powder-based additive manufacturing processes, such as Laser Direct Energy Deposition (LDED), require control over powder material delivery for achieving desired material properties and functional characteristics in manufactured components. In these processes, the controlled dispensing of powder materials plays an important role in determining the quality and properties of the final product. Conventional powder feeding systems typically employ rotating disc mechanisms for powder flow control. These systems utilize individual disc setups where each disc controls the flow of a single powder material. The powder flow rate in such systems is primarily controlled through the rotational speed of the disc, typically measured in revolutions per minute (rpm) or rotations per minute. However, these conventional systems present several technical challenges and operational limitations.

Conventional systems require extensive experimentation and calibration to establish the relationship between disc rotational speed and powder flow rate for different materials. This calibration process involves rotating the disc at various speeds and measuring the amount of powder collected over specific time intervals to calculate the powder flow rate in units such as grams per minute. Furthermore, since powder flow rate depends on material density, this calibration process must be repeated whenever the material type or composition changes. The limitations of conventional systems become particularly apparent in applications requiring real-time composition control or the production of functionally graded materials. These systems typically lack the capability of simultaneous control of multiple powder flows and real-time composition adjustment. Additionally, their individual disc configurations result in larger spatial footprints and increased complexity in setup and operation of such systems.

CN112157259B describes a powder feeding apparatus utilizing a hopper and rotating disk configuration. The system implements an air pump for generating pressure differential to facilitate powder transport, while incorporating a screw mechanism in the feed hopper for controlled powder delivery to the rotating disk.

CN207222942U describes a powder feeding mechanism incorporating a powder disc with integrated groove features. The system utilizes a protective gas flow within a chamber, where powder accumulates on the powder disc and transfers through coordinated alignment between the groove and a powder suction port.

U.S. Pat. No. 10,786,870B2 describes a powder supply apparatus incorporating screw conveyor mechanisms for powder transfer operations. The system implements powder stirring functionality during transport between primary and intermediate hoppers to maintain material flow characteristics.

CN217941858U describes a powder distribution mechanism incorporating weight measurement capabilities through sensor implementation. The system utilizes screw conveyor configurations for spiral mixing operations in conjunction with distribution funnel geometries.

Each of the aforementioned references suffers from one or more drawbacks hindering their adoption, such as limited material handling capabilities, complex calibration requirements, constrained flow rate ranges, inability to achieve compositional control, substantial spatial requirements, and operational inefficiencies arising from non-integrated configurations. None of the aforementioned references describe providing simultaneous control over multiple powder materials through compact mechanical configurations while maintaining independent control over material flow rates and enabling real-time composition monitoring capabilities. Accordingly, it is one object of the present disclosure to provide a feeder system that enables control over multiple powder materials while maintaining compact dimensional characteristics and real-time monitoring capabilities for advanced manufacturing applications.

SUMMARY

In an exemplary embodiment, a feeder system includes a first wheel that is donut-ring-shaped and has a first groove recessed below a top surface of the first wheel; a first hopper positioned above the first wheel and configured to receive a first material; a first conduit connecting a bottom of the first hopper to the first groove and defining a first feeding path for the first material; a mixer unit; a first suction head having a first end connected to the first groove and a second end connected to the mixer unit; a first motor configured to rotate the first wheel so that the first material is transferred from the first hopper to the first groove via the first conduit and then to the mixer unit via the first suction head; a second wheel that is donut-ring-shaped and has a second groove recessed below a top surface of the second wheel; a second hopper positioned above the second wheel and configured to receive a second material; a second conduit connecting a bottom of the second hopper to the second groove and defining a second feeding path for the second material; a second suction head having a first end connected to the second groove and a second end connected to the mixer unit; and a second motor configured to rotate the second wheel so that the second material is transferred from the second hopper to the second groove via the second conduit and then to the mixer unit via the second suction head, wherein the mixer unit is configured to mix the first material and the second material.

In some embodiments, the feeder system further includes a shaft extending through a center of the first wheel and a center of the second wheel, wherein the first wheel and the second wheel are co-axial.

In some embodiments, the first wheel is positioned above the second wheel, and the first wheel has a smaller circumference than the second wheel.

In some embodiments, the first groove surrounds an inner side surface of the first wheel by 360 degrees and is surrounded by an outer side surface of the first wheel by 360 degrees, and the second groove surrounds an inner side surface of the second wheel by 360 degrees and is surrounded by an outer side surface of the second wheel by 360 degrees.

In some embodiments, the first conduit and the first suction head are positioned at different angular positions of the first groove, and the second conduit and the second suction head are positioned at different angular positions of the second groove.

In some embodiments, the first suction head and the second suction head are positioned at a same angular position relative to the shaft.

In some embodiments, the first groove is ring-shaped, and the second groove is ring-shaped.

In some embodiments, when viewed along the shaft, the outer side surface of the first wheel is surrounded by the inner side surface of the second wheel by 360 degrees.

In some embodiments, when viewed along the shaft, the outer side surface of the first wheel is spaced apart from the inner side surface of the second wheel.

In some embodiments, the first groove defines a first continuous ring-shaped space to receive the first material, and the second groove defines a second continuous ring-shaped space to receive the second material.

In some embodiments, the first suction head is shorter than the second suction head.

In some embodiments, the first end of the first suction head is tapered and is positioned in the first groove, and the first end of the second suction head is tapered and is positioned in the second groove.

In some embodiments, the feeder system further includes a vacuum pump including a first flow line connecting the second end of the first suction head to the mixer unit; and a second flow line connecting the second end of the second suction head to the mixer unit.

In some embodiments, the first hopper includes a first screw feeder, and the second hopper includes a second screw feeder.

In some embodiments, the feeder system further includes a first screw motor configured to rotate the first screw feeder; and a second screw motor configured to rotate the second screw feeder.

In some embodiments, the first screw motor is configured to rotate the first screw feeder at a different speed from the first wheel, and the second screw motor is configured to rotate the second screw feeder at a different speed from the second wheel.

In some embodiments, the feeder system further includes a first sensor positioned below the first hopper and configured to measure a weight of the first hopper and the first material therein; and a second sensor positioned below the second hopper and configured to measure a weight of the second hopper and the second material therein.

In some embodiments, the feeder system further includes a first wheel disc that is in direct contact with the first wheel; and a second wheel disc that is in direct contact with the second wheel, wherein the first motor is configured to rotate the first wheel by rotating the first wheel disc which rotates the first wheel, and the second motor is configured to rotate the second wheel by rotating the second wheel disc which rotates the second wheel.

In some embodiments, the feeder system further includes a third wheel that is donut-ring-shaped and has a third groove recessed below a top surface of the third wheel; a third hopper positioned above the third wheel and configured to receive a third material; a third conduit connecting a bottom of the third hopper to the third groove and defining a third feeding path for the third material; a third suction head having a first end connected to the third groove and a second end connected to the mixer unit; and a third motor configured to rotate the third wheel so that the third material is transferred from the third hopper to the third groove via the third conduit and then to the mixer unit via the third suction head, wherein the mixer unit is configured to mix the first material, the second material and the third material.

In some embodiments, the feeder system further includes a shaft extending through a center of the first wheel and a center of the second wheel, wherein the first wheel, the second wheel and the third wheel are co-axial, the first wheel is positioned above the second wheel which is positioned above the third wheel, and the first wheel has a smaller circumference than the second wheel which has a smaller circumference than the third wheel.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1A:
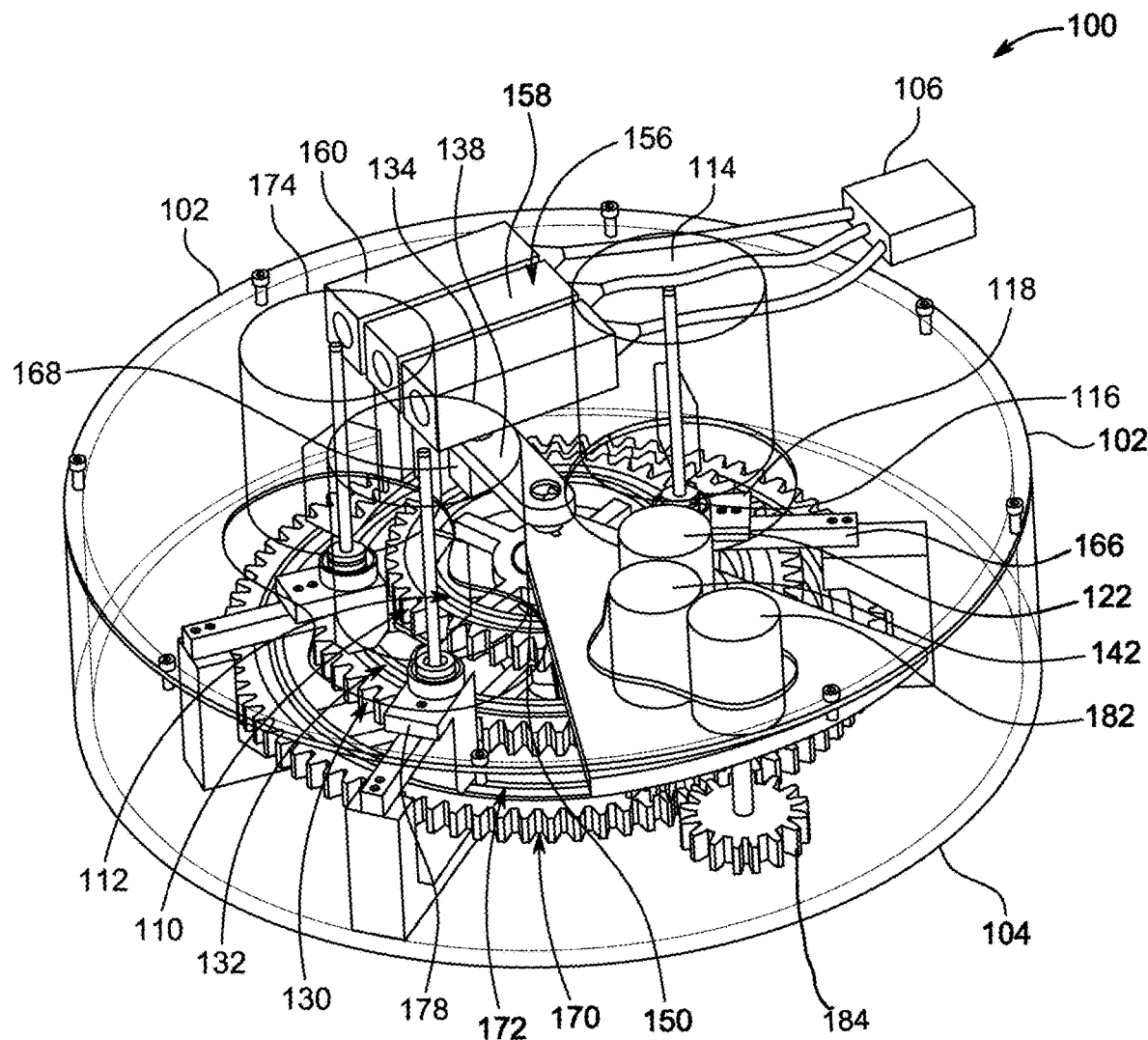
FIG. 1A is an exemplary perspective view of a feeder system from one side, according to certain embodiments.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a feeder system incorporating multiple material handling mechanisms arranged in a spatially efficient configuration. The feeder system implements a coaxial multi-disc compact design with real-time weight and flow rate measurement of the powder materials by simultaneous rotation of screw feeders and rotating discs in order to achieve controlled composition of the powder materials. The feeder system integrates powder transport pathways, coordinated motion control, and real-time measurement capabilities to achieve regulation of powder material flow rates and compositions. The feeder system enables simultaneous processing of multiple powder materials while maintaining independent control over individual material parameters.

Figure 1B:
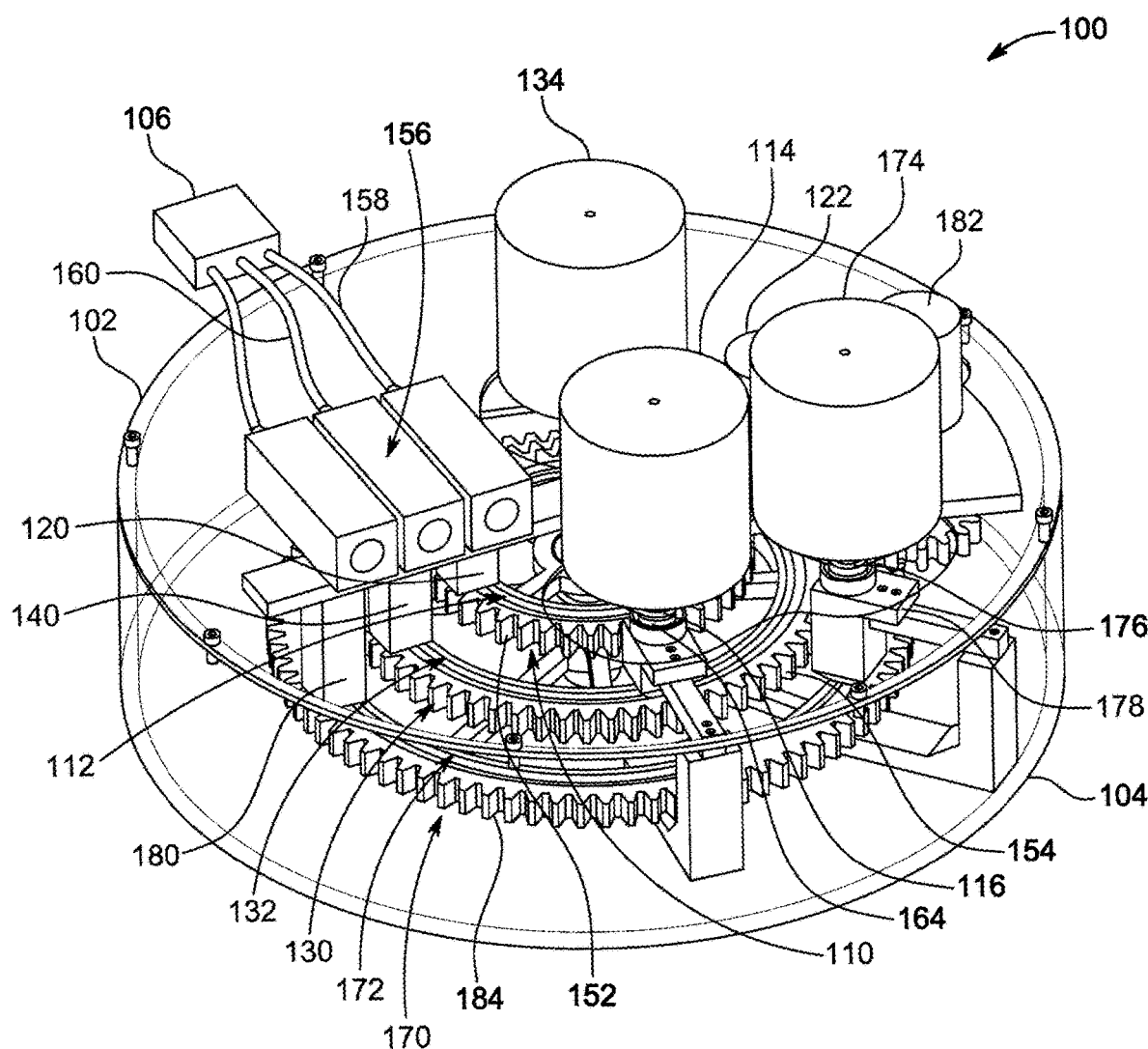
FIG. 1B is an exemplary perspective view of the feeder system from another side, according to certain embodiments.
Figure 1C:
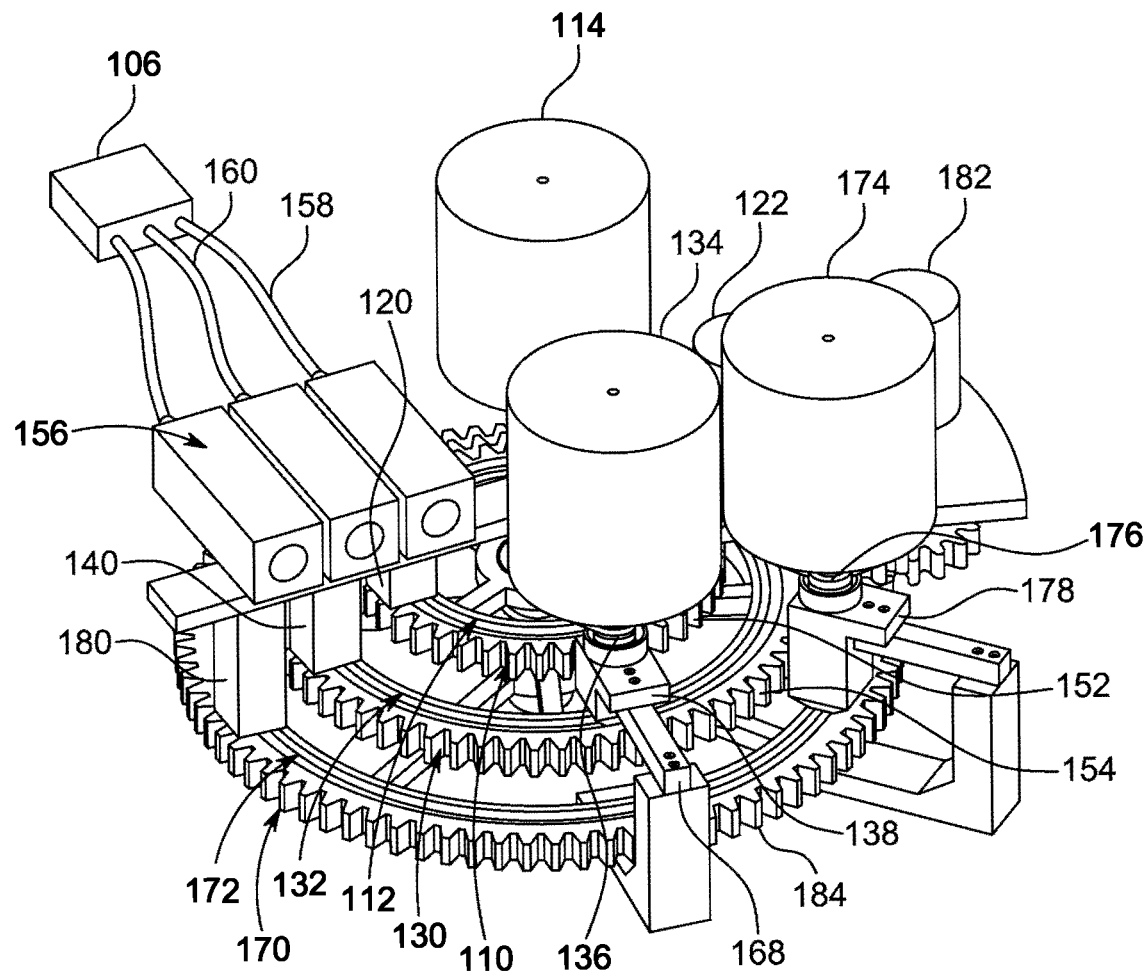
FIG. 1C is an exemplary perspective view illustrating arrangement of internal components of the feeder system, according to alternate embodiments.
Figure 1D:
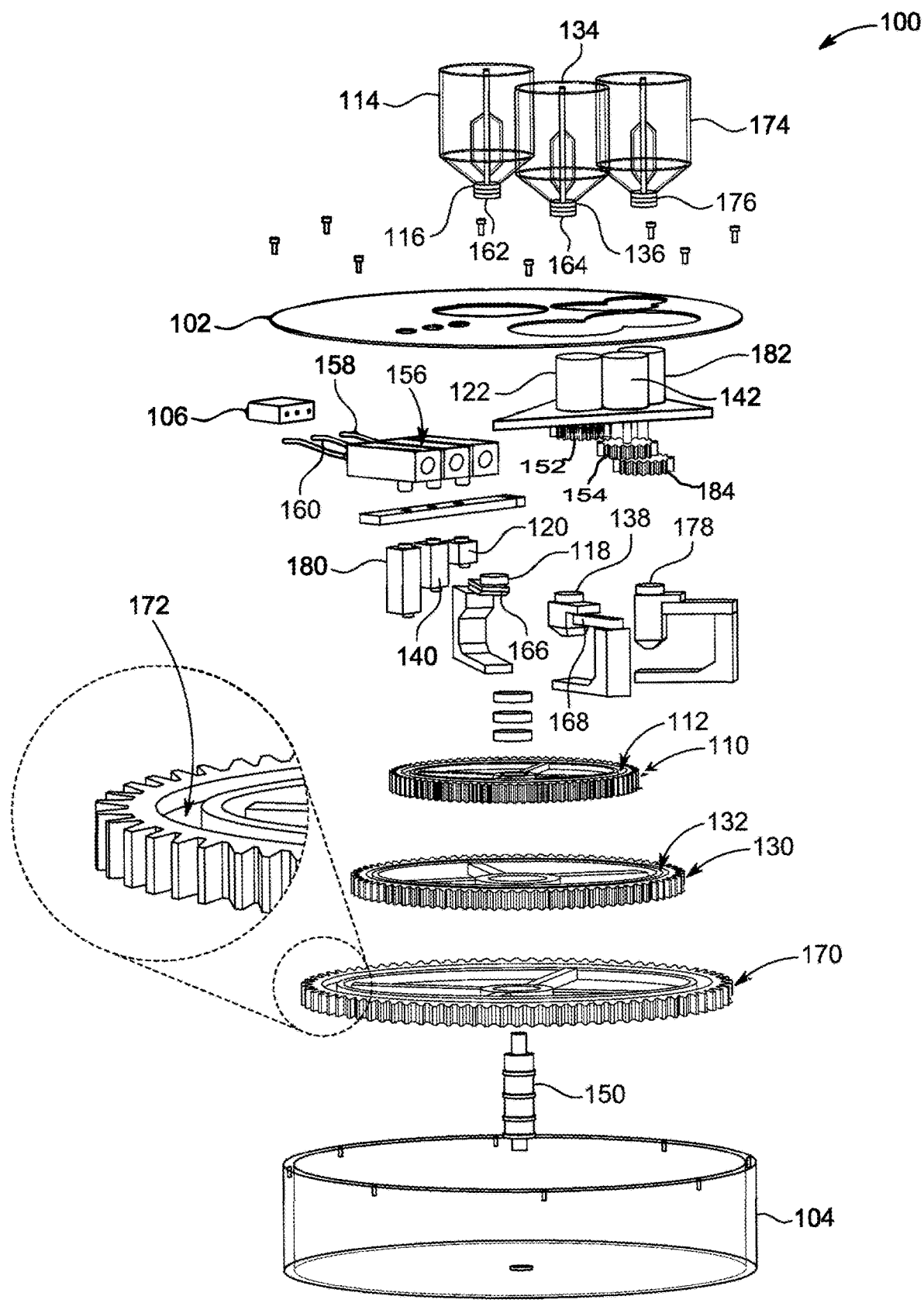
FIG. 1D is an exemplary exploded view of the feeder system, according to certain embodiments.

Referring to FIGS. 1A-1D in combination, illustrated are different views of a feeder system (as represented by reference numeral 100) in which, FIG. 1A illustrates a perspective view of the feeder system 100 from one side, FIG. 1B illustrates a perspective view of the feeder system 100 from another side, FIG. 1C illustrates a perspective view of the feeder system 100 without its covers (as discussed later) for simplification, and FIG. 1D illustrates an exploded view of the feeder system 100 for showing its internal components in detail. The feeder system 100 of the present disclosure is a coaxial multi-disc powder feeder system (with the two terms being interchangeably used herein) that addresses fundamental challenges in material processing applications. The feeder system 100 combines multiple powder transport mechanisms, measurement capabilities, and control functionalities within a unified framework to enable material composition control.

The feeder system 100 implements geometric arrangements that reduces spatial requirements while improving operational efficiency. The feeder system 100 also supports implementation of automated control strategies for maintaining various material compositions during extended operation periods. The feeder system 100 employs advanced control algorithms to enable real-time adjustment of processing parameters based on continuous monitoring of material flow characteristics. The feeder system 100 maintains compatibility with diverse powder materials including metals, ceramics, and polymers, enabling applications across multiple industrial sectors including additive manufacturing, pharmaceutical processing, and advanced materials development.

As illustrated in FIGS. 1A-1D, the feeder system 100 includes multiple mechanical components configured for controlled delivery of powder materials. The feeder system 100 includes multiple wheels arranged in a vertical stack configuration, in which each wheel includes specific structural features for powder transport operations. The configuration of the feeder system 100 enables generation of functionally graded materials through control over constituent ratios, while maintaining scalability to accommodate varying throughput requirements. Further, the integration of multiple measurement technologies in the feeder system 100 enables process verification without requiring external calibration procedures.

In particular, the feeder system 100 includes a structural enclosure defined by a top cover 102 and a bottom cover 104, which establish the dimensional envelope for mounting and operational containment of internal components of the feeder system 100. The top cover 102 may include mounting features configured to support multiple powder material hoppers, drive motors, and associated mechanical components, while maintaining various geometric relationships between assembled elements. The bottom cover 104 may include structural support features that enable accurate positioning of bearing assemblies, sensor components, and powder transport mechanisms. The top cover 102 and the bottom cover 104 may maintain sealed interfaces through gasket elements and mechanical fasteners, establishing controlled environmental conditions for powder material handling operations in the feeder system 100.

The feeder system 100 also includes a mixer unit 106. The mixer unit 106 includes a mixing chamber having a volumetric capacity, which is not particularly limited and can for example be between 50 cubic centimeters and 2,000 cubic centimeters. Geometric parameters of the mixer unit 106 including chamber height, diameter, and internal surface characteristics are not particularly limited. The mixer unit 106 includes multiple inlet ports configured to receive powder materials. In some examples, the mixer unit 106 may include features for prevention of material accumulation or stagnation during operation. The mixer unit 106 interfaces with other components in the feeder system 100 which generate controlled negative pressure conditions for powder material transport through the connected flow paths, as discussed later in the description in more detail.

The feeder system 100 includes a first wheel 110 that is donut-ring-shaped and has a first groove 112 recessed below a top surface of the first wheel 110. The first wheel 110 of the feeder system 100 has the donut-ring shape having a first diameter and includes the first groove 112 defined within the first wheel 110. The first groove 112 extends in the circumferential direction and is recessed below the top surface of the first wheel 110 by a certain depth. Further, an outer side surface of the first wheel 110 surrounds the first groove 112 through a complete 360-degree circumference. The first groove 112 defines a material containment volume configured for temporary retention of powder material during transport operations. The dimensional parameters of the first groove 112, including its width and depth, are not particularly limited and may vary for example based on required powder material and flow rate ranges. Preferably the first wheel has a flat top surface and the groove has a flat bottom surface.

The feeder system 100 further includes a first hopper 114 positioned above the first wheel 110 and configured to receive a first material. The first hopper 114 is mounted in a position above the first wheel 110. The first hopper 114 has an internal volume configured for receiving and storing a first powder material. Herein, the vertical spacing between the bottom surface of the first hopper 114 and the top surface of the first wheel 110 enables controlled powder material flow. The dimensional parameters of the first hopper 114, including its height and cross-sectional area, are not particularly limited and may vary for example based on required material processing duration and flow rate requirements. The first hopper 114 may include geometric features designed for consistent powder material flow characteristics, including sidewall angles to prevent material agglomeration.

In some embodiments, the first hopper 114 includes a first screw feeder 116. The first hopper 114 of the feeder system 100 includes the first screw feeder 116 that implements helical geometry for controlled powder material transport. The first screw feeder 116 may have various thread pitch, flight depth, shaft diameter, and other relevant parameters based on flow requirements of the powder material in the feeder system 100. The first screw feeder 116 maintains proper fit within the first hopper 114 through bearing supports and shaft seals, enabling controlled powder material transfer from the first hopper 114 to the first groove 112 within the feeder system 100.

The feeder system 100 further includes a first conduit 118 connecting a bottom of the first hopper 114 to the first groove 112 and defining a first feeding path for the first material. Herein, the first conduit 118 extends from the bottom section of the first hopper 114 to the first groove 112, such that the first conduit 118 defines a first feeding path for directing the first powder material from the first hopper 114 to the first groove 112. The first conduit 118 can maintain fixed alignment with both the first hopper 114 and the first groove 112 to ensure consistent powder material transport through the defined feeding path. In some configurations, the first conduit 118 may include a connection interface at the first hopper 114 to maintain various angular orientation relative to vertical. The first conduit 118 may terminate at an interface with the first groove 112, in which the interface position maintains an angular offset from the material extraction position. It may be understood that the dimensional parameters of the first conduit 118, including its internal diameter and length, are not particularly limited and may vary for example based on required powder material flow characteristics.

The feeder system 100 further includes a first suction head 120 having a first end connected to the first groove 112 and a second end connected to the mixer unit 106. In particular, the first end of the first suction head 120 has a tapered geometry that extends into the first groove 112. The second end of the first suction head 120 connects to a designated inlet port of the mixer unit 106 through a flow line. Herein, the first conduit 118 and the first suction head 120 connect to the first groove 112 at different angular positions. The dimensional parameters of the first suction head 120, including its length and any bend radius, and the like, are not particularly limited and may for example be configured based on the spatial arrangement between the first wheel 110 and the mixer unit 106.

The feeder system 100 further includes a first motor 122 configured to rotate the first wheel 110 so that the first material is transferred from the first hopper 114 to the first groove 112 via the first conduit 118 and then to the mixer unit 106 via the first suction head 120. The first motor 122 of the feeder system 100 generates rotational motion having angular velocity within an operational range of e.g. 0-300 rpm such as 0 rpm, 50 rpm, 100 rpm, 150 rpm, 200 rpm, 250 rpm, 300 rpm or any values therebetween. The first motor 122 connects to the first wheel 110 through a drive assembly that maintains mechanical coupling for torque transmission. The rotational motion of the first motor 122 enables controlled transport of the first material from the first conduit 118 to the first suction head 120 through the first groove 112. The first motor 122 can maintain rotational speed regulation through closed-loop control based on feedback signals from rotational position sensors (not shown). The operational parameters of the first motor 122, including torque output and speed stability, are not particularly limited and may vary for example based on requirements for consistent powder material transport rates under varying load conditions.

The feeder system 100 further includes a second wheel 130 that is donut-ring-shaped and has a second groove 132 recessed below a top surface of the second wheel 130. The second wheel 130 of the feeder system 100 has the donut-ring-shaped configuration having an outer diameter and an inner diameter, with the outer diameter of the second wheel 130 exceeding the outer diameter of the first wheel 110. The second wheel 130 includes the second groove 132 that extends continuously around the circumference of the second wheel 130. Herein, the second groove 132 maintains a recessed position below the top surface of the second wheel 130. The second groove 132 defines a material containment volume configured for temporary retention of powder material during transport operations. The dimensional parameters of the second groove 132, including its width and depth, are not particularly limited and may vary for example based on required powder material flow rate ranges.

The feeder system 100 further includes a second hopper 134 positioned above the second wheel 130 and configured to receive a second material. The second hopper 134 of the feeder system 100 maintains a fixed position above the second wheel 130, in which vertical spacing between the bottom surface of the second hopper 134 and the top surface of the second wheel 130 enables controlled powder material flow. The second hopper 134 includes an internal volume configured for containment of the second powder material. The second hopper 134 includes geometric features for consistent powder material flow characteristics, including sidewall angles to prevent material agglomeration. The dimensional parameters of the second hopper 134, including height and cross-sectional area, are not particularly limited and may vary for example based on required material processing duration and flow rate requirements.

In some embodiments, the second hopper 134 includes a second screw feeder 136. The second hopper 134 of the feeder system 100 includes the second screw feeder 136 that implements helical geometry designed for controlled powder material transport. The second screw feeder 136 may have various thread pitch, flight depth, shaft diameter, and other relevant parameters based on flow requirements of the powder material in the feeder system 100. The second screw feeder 136 maintains proper fit within the second hopper 134 through bearing supports and shaft seals, enabling controlled powder material transfer from the second hopper 134 to the associated second groove 132 within the feeder system 100.

The feeder system 100 further includes a second conduit 138 connecting a bottom of the second hopper 134 to the second groove 132 and defining a second feeding path for the second material. The second conduit 138 of the feeder system 100 extends from the bottom section of the second hopper 134 to the second groove 132, in which the second conduit 138 defines a second feeding path for directing the second powder material. The dimensional parameters of the second conduit 138, including internal diameter and length, are not particularly limited and may vary for example based on required powder material flow characteristics. The second conduit 138 can maintain fixed alignment with both the second hopper 134 and the second groove 132 to ensure consistent powder material transport through the defined second feeding path.

The feeder system 100 further includes a second suction head 140 having a first end connected to the second groove 132 and a second end connected to the mixer unit 106. The first end of the second suction head 140 includes a tapered geometry that extends into the second groove 132. The second end of the second suction head 140 connects to a designated inlet port of the mixer unit 106 through a flow line. The second suction head 140 and the second conduit 138 are at different angular positions of the second wheel 130. The dimensional parameters of the second suction head 140, including length and bend radius, are configured based on the spatial arrangement between the second wheel 130 and the mixer unit 106. Geometric features of the second suction head 140 including internal diameter, wall thickness, and taper angle are not particularly limited and may vary depending on specific design requirements.

The feeder system 100 further includes a second motor 142 configured to rotate the second wheel 130 so that the second material is transferred from the second hopper 134 to the second groove 132 via the second conduit 138 and then to the mixer unit 106 via the second suction head 140. The second motor 142 of the feeder system 100 generates rotational motion having angular velocity within an operational range of e.g. 0-300 rpm such as 0 rpm, 50 rpm, 100 rpm, 150 rpm, 200 rpm, 250 rpm, 300 rpm or any values therebetween. The second motor 142 connects to the second wheel 130 through a drive assembly that maintains mechanical coupling for torque transmission. The rotational motion of the second motor 142 enables controlled transport of the second material from the second conduit 138 position to the second suction head 140 position through the second groove 132. The second motor 142 maintains rotational speed regulation through closed-loop control based on feedback signals from rotational position sensors. The operational parameters of the second motor 142, including torque output and speed stability, are not particularly limited and may for example vary based on requirements for consistent powder material transport rates under varying load conditions.

In the feeder system 100, the mixer unit 106 is configured to mix the first material and the second material. Herein, the mixer unit 106 mixes the first material and the second material to generate powder mixtures having various compositional ratios. The mixer unit 106 implements a mixing chamber configuration that enables uniform distribution of powder materials received through the first suction head 120 and the second suction head 140. The mixing chamber of the mixer unit 106 enables efficient powder material combination operations. The mixer unit 106 can include flow control features that regulate powder material transport rates through the first suction head 120 and the second suction head 140 connected thereto.

In some embodiments, during operation of the feeder system 100, the powder materials are initially loaded into the first hopper 114 and the second hopper 134. The first motor 122 and the second motor 142 generate rotational motion of the first wheel 110 and the second wheel 130 respectively and independently, maintaining respective angular velocities. As the first wheel 110 rotates, the first material transfers from the first hopper 114 through the first conduit 118 into the first groove 112. Simultaneously or separately, rotation of the second wheel 130 enables transfer of the second material from the second hopper 134 through the second conduit 138 into the second groove 132. The rotational motion of the wheels 110, 130 transports the powder materials from their respective conduits 118, 138 to the corresponding suction head positions. The first suction head 120 and the second suction head 140 extract the powder materials from the first groove 112 and the second groove 132 respectively, utilizing vacuum pressure generated by a pump system (as discussed later in detail) to transport the materials to the mixer unit 106. Within the mixer unit 106, the powder materials undergo mixing operations to achieve various compositional distributions for subsequent processing applications. Details of other components supporting this operation have been discussed in the proceeding paragraphs. The weight ratio of the first material to the second material can be controlled by e.g. rotational speeds of the first wheel 110, the second wheel 130, the first screw feeder 116 and the second screw feeder 136.

In some embodiments, the feeder system 100 includes a main shaft 150 extending through a center of the first wheel 110 and a center of the second wheel 130. Herein, the first wheel 110 and the second wheel 130 are co-axial, i.e., are maintained in a co-axial configuration. The main shaft 150 establishes a central rotational axis for both wheels 110, 130 and implements mechanical support features that enable independent wheel rotation while maintaining axial alignment. For example, the main shaft 150 can interface with bearing assemblies mounted within central openings of the first wheel 110 and second wheel 130, in which these bearing assemblies facilitate smooth rotational motion while maintaining dimensional stability. The main shaft 150 extends vertically through the complete assembly of the feeder system 100, providing structural support and maintaining geometric alignment of rotating components including the first wheel 110 and the second wheel 130.

In the feeder system 100, the first wheel 110 is positioned above the second wheel 130. The feeder system 100 maintains a vertical arrangement in which the first wheel 110 is positioned above the second wheel 130, establishing a multi-level powder transport configuration. Herein, the first wheel 110 has a smaller circumference than the second wheel 130. The first wheel 110 includes a circumferential dimension that is smaller than the circumferential dimension of the second wheel 130, enabling a compact nested and staggered arrangement of the two wheels 110, 130. The vertical spacing between the first wheel 110 and the second wheel 130 may be maintained by spacers mounted on the main shaft 150. This spacing enables independent rotation of the wheels 110, 130 without mechanical interference. The smaller circumference of the first wheel 110 relative to the second wheel 130 enables implementation of different powder transport volumes while maintaining coordinated powder delivery through the vertical arrangement of components in the feeder system 100.

In some embodiments, the first groove 112 surrounds an inner side surface (facing the main shaft 150) of the first wheel 110 by 360 degrees and is surrounded by an outer side surface (facing away from the main shaft 150) of the first wheel 110 by 360 degrees. The first groove 112 of the feeder system 100 maintains a continuous ring-shaped configuration that extends completely around the inner side surface of the first wheel 110 through a full 360-degree circumference, while the outer side surface of the first wheel 110 provides complete 360-degree circumferential containment of the first groove 112. Similarly, the second groove 132 surrounds an inner side surface (facing the main shaft 150) of the second wheel 130 by 360 degrees and is surrounded by an outer side surface (facing away from the main shaft 150) of the second wheel 130 by 360 degrees. The second groove 132 extends continuously around the inner side surface of the second wheel 130 through a complete 360-degree circumference while being fully contained by the outer side surface of the second wheel 130 through a complete 360-degree circumference. The geometric configuration of both grooves 112, 132 enables continuous powder material transport through complete rotational cycles of the respective wheels 110, 130 while maintaining material containment within the defined volumes by the respective grooves 112, 132 of the feeder system 100.

In some embodiments, the first groove 112 is ring-shaped. The second groove 132 is ring-shaped. Both grooves 112, 132 include geometric features designed for powder material containment and transport. Herein, the ring-shaped configuration enables continuous material flow during wheel rotation while preventing material dispersion outside the defined groove boundaries within the feeder system 100.

In some embodiments, when viewed along (e.g. a longitudinal direction of) the main shaft 150, the outer side surface of the first wheel 110 is surrounded by the inner side surface of the second wheel 130 by 360 degrees. Further, when viewed along (e.g. a longitudinal direction of) the main shaft 150, the outer side surface of the first wheel 110 is spaced apart from the inner side surface of the second wheel 130. That is, when viewing the feeder system 100 along the axial direction of the main shaft 150, the outer side surface of the first wheel 110 is completely encompassed by the inner side surface of the second wheel 130 through a complete 360-degree circumference, establishing a nested and staggered wheel configuration. The feeder system 100 maintains a radial clearance between the outer side surface of the first wheel 110 and the inner side surface of the second wheel 130. This spacing prevents mechanical interference during independent rotation of the wheels while maintaining compact dimensional characteristics of the overall assembly. The concentric arrangement of the first wheel 110 and second wheel 130 enables implementation of multiple powder transport paths with reduced space requirements for the feeder system 100.

Further, in the feeder system 100, the first groove 112 defines a first continuous ring-shaped space to receive the first material and transport the first material during operation. Similarly, the second groove 132 defines a second continuous ring-shaped space to receive the second material and transport the second material. The continuous nature of both grooves 112, 132 enables uninterrupted powder material flow through complete rotational cycles of the respective wheels 110, 130. Herein, the ring-shaped configuration maintains consistent material containment volume throughout the rotation. The dimensional specifications of both grooves 112, 132 are not particularly limited and may for example vary based on required powder material flow rates and transport characteristics within the feeder system 100.

Furthermore, in some embodiments, the first conduit 118 and the first suction head 120 are positioned at different angular positions of the first groove 112. Similarly, the second conduit 138 and the second suction head 140 are positioned at different angular positions of the second groove 132. That is, the feeder system 100 implements offset angular positioning of powder transport components in which the first conduit 118 and the first suction head 120 maintain different angular positions along the first groove 112 to enable controlled material transport sequences. Similarly, the second conduit 138 and the second suction head 140 are positioned at different angular positions along the second groove 132. The angular separation between conduit and suction head positions can be used to establish required powder material residence time within each groove during wheel rotation. The first conduit 118 maintains a first angular position while the first suction head 120 is positioned at a second angular position, such that the difference between the two angular positions defines the powder transport arc length along the first groove 112. Independently, the second conduit 138 and the second suction head 140 maintain similar or different angular positions along the second groove 132.

In some embodiments, the first suction head 120 and the second suction head 140 are positioned at a same angular position relative to the shaft 150. The feeder system 100 can therefore include a synchronized powder extraction configuration by maintaining the first suction head 120 and second suction head 140 at an identical angular position relative to the main shaft 150. This aligned positioning of suction heads enables compact space-saving design and coordinated powder material extraction from both wheels 110, 130 while maintaining uniform flow path geometry to the mixer unit 106. The angular position of both suction heads 120, 140 can be used to control powder material extraction efficiency based on rotational dynamics and vacuum transport parameters within the feeder system 100. The common radial positioning further enables implementation of simplified support structures and vacuum flow path routing within the feeder system 100.

In the feeder system 100, the first suction head 120 is shorter than the second suction head 140. The feeder system 100 implements such suction head configuration to accommodate the vertical spacing between the first wheel 110 and the second wheel 130, while maintaining identical outlet positions at the mixer unit 106. The length difference between the suction heads 120, 140 based on the vertical spacing between the wheels 110, 130 is not particularly limited.

Further, in the feeder system 100, the first end of the first suction head 120 is tapered and is positioned in the first groove 112, and the first end of the second suction head 140 is tapered and is positioned in the second groove 132. The feeder system 100 includes such geometry for the suction heads 120, 140 with tapered configuration at the powder extraction interfaces to maintain dimensional fit within the respective grooves 112, 132. The tapered configurations of both suction heads 120, 140 enable efficient powder material extraction while reducing disruption to material flow within the grooves 112, 132. The taper angles and dimensional specifications are not particularly limited and may for example vary based on powder material characteristics and required extraction performance parameters of the feeder system 100.

As mentioned in the preceding paragraphs, the feeder system 100 further includes at least one vacuum pump 156, e.g. a venturi vacuum pump, a first flow line 158 connecting the second end of the first suction head 120 to the mixer unit 106, and a second flow line 160 connecting the second end of the second suction head 140 to the mixer unit 106. The feeder system 100 includes the vacuum pump 156 to provide vacuum-driven material transport configuration in which the first flow line 158 establishes a powder transport path between the second end of the first suction head 120 and the mixer unit 106, and the second flow line 160 similarly connects the second end of the second suction head 140 to the mixer unit 106. Both flow lines 158, 160 can be tuned for consistent powder material transport under vacuum conditions. The flow lines 158, 160 interface with dedicated inlet ports on the mixer unit 106. In the present configuration, the mixer unit 106 interfaces with the vacuum pump 156 that generates controlled negative pressure conditions e.g. within a range of 0.2 to 0.8 bar for consistent powder material transport through the connected flow lines 158, 160.

Further, in some embodiments, the feeder system 100 includes a first screw motor 162 configured to rotate the first screw feeder 116, and a second screw motor 164 configured to rotate the second screw feeder 136. The feeder system 100 implements such independent screw feeder control through the first screw motor 162 configured to generate rotational motion of the first screw feeder 116 and the second screw motor 164 similarly providing rotational drive for the second screw feeder 136. Both motors 162, 164 include closed-loop control capabilities enabling regulation of rotational speeds of the respective screw feeders 116, 136. The motors 162, 164 connect to their respective screw feeders 116, 136 through mechanical drive assemblies that maintain positive engagement.

In some embodiments, the first screw motor 162 is configured to rotate the first screw feeder 116 at a different speed from the first wheel 110, and the second screw motor 164 is configured to rotate the second screw feeder 136 at a different speed from the second wheel 130. That is, the first screw motor 162 of the feeder system 100 operates to rotate the first screw feeder 116 at a rotational speed independently controlled relative to the rotational speed of the first wheel 110. Similarly, the second screw motor 164 maintains independent speed control of the second screw feeder 136 relative to the second wheel 130. This independent speed control capability enables control of powder material transfer rates through independent adjustment of screw feeder and wheel rotational parameters. The operational speed ranges are not particularly limited and can for example extend from 0 to 300 rpm such as 0 rpm, 50 rpm, 100 rpm, 150 rpm, 200 rpm, 250 rpm, 300 rpm or any values therebetween for screw feeders 116, 136, and from 0 to 300 rpm such as 0 rpm, 50 rpm, 100 rpm, 150 rpm, 200 rpm, 250 rpm, 300 rpm or any values therebetween for wheels 110, 130 within the feeder system 100.

In some embodiments, the feeder system 100 includes a first sensor 166 positioned below the first hopper 114 and configured to measure a weight of the first hopper 114 and the first material therein, and a second sensor 168 positioned below the second hopper 134 and configured to measure a weight of the second hopper 134 and the second material therein. The feeder system 100 includes such weight monitoring capabilities through the first sensor 166 positioned below the first hopper 114 to measure the combined weight of the first hopper 114 and contained first material. The second sensor 168 maintains similar measurement capability for the second hopper 134 and second material. Both sensors 166, 168 generate continuous weight measurement signals enabling real-time monitoring of powder material consumption rates. The measurement range is not particularly limited and can for example extend from 0 to 5000 grams with resolution of 0.1 grams, enabling tracking of material transfer rates through the feeder system 100. The sensors 166, 168 outputs interface with control systems to enable automated regulation of powder material flow rates based on measured weight changes.

In some embodiments, the feeder system 100 further includes a first wheel disc 152 that is in direct contact with the first wheel 110, and a second wheel disc 154 that is in direct contact with the second wheel 130. Herein, the first wheel disc 152 has a drive interface geometry configured for positive engagement with the first wheel 110, such that this interface enables efficient torque transmission while maintaining rotational alignment. The second wheel disc 154 implements similar or identical interface characteristics with the second wheel 130. In the feeder system 100, the first motor 122 is configured to rotate the first wheel 110 by rotating the first wheel disc 152 which rotates the first wheel 110, and the second motor 142 is configured to rotate the second wheel 130 by rotating the second wheel disc 154 which rotates the second wheel 130. The first motor 122 connects to the first wheel disc 152 through a drive assembly that converts motor rotational output to wheel rotation, in which rotation of the first wheel disc 152 directly drives rotation of the first wheel 110. Similarly, the second motor 142 connects to the second wheel disc 154, enabling controlled rotation of the second wheel 130 through direct mechanical coupling with the second wheel disc 154. Both wheel discs 152, 154 include dimensional specifications designed for stable torque transmission while maintaining concentricity with the main shaft 150 of the feeder system 100.

During operation of the feeder system 100, powder materials are initially loaded into the first hopper 114 and the second hopper 134, with material weights continuously monitored by the first sensor 166 and the second sensor 168 respectively. The first screw feeder 116 and the second screw feeder 136, driven by the first screw motor 162 and the second screw motor 164 respectively, operate at independently controlled speeds of e.g. 0-300 rpm such as 0 rpm, 50 rpm, 100 rpm, 150 rpm, 200 rpm, 250 rpm, 300 rpm or any values therebetween to transport powder materials from the hoppers 114, 134 to their corresponding grooves 112, 132. Independently, the first motor 122 and the second motor 142 drive rotation of the first wheel 110 and the second wheel 130 through the first wheel disc 152 and the second wheel disc 154 respectively, maintaining speeds of e.g. 0-300 rpm such as 0 rpm, 50 rpm, 100 rpm, 150 rpm, 200 rpm, 250 rpm, 300 rpm or any values therebetween.

As the wheels 110, 130 rotate, powder materials deposited in the first groove 112 and the second groove 132 through the first conduit 118 and the second conduit 138 are transported to positions aligned with the first suction head 120 and the second suction head 140, respectively. The vacuum pump generates negative pressure through the first flow line 158 and the second flow line 160, enabling extraction of powder materials through the tapered ends of the suction heads 120, 140. The extracted materials travel through the flow lines 158, 160 to the mixer unit 106, where controlled mixing operations generate powder mixtures with various compositional characteristics. This coordinated operation of multiple mechanical components enables control over the rate of transfer of the powder material and the mixing ratios thereof, within the feeder system 100.

In some embodiments, as illustrated, the feeder system 100 includes a third wheel 170. The embodiment of the third wheel 170 is similar to the embodiment of the first wheel 110 and the embodiment of the second wheel 130, with differences in e.g. dimensions. For example, the third wheel 170 is donut-ring-shaped and has a third groove 172 recessed below a top surface of the third wheel 170. The third wheel 170 has the donut-ring-shaped configuration having an outer diameter exceeding the outer diameter of the second wheel 130. The third wheel 170 includes the third groove 172 extending continuously around the circumference and recessed below the top surface of the third wheel 170. The feeder system 100 further includes a third hopper 174 positioned above the third wheel 170 and configured to receive a third material. The third hopper 174 can maintain fixed position above the third wheel 170 and include a third screw feeder 176 for controlled powder transport. The feeder system 100 further includes a third conduit 178 connecting a bottom of the third hopper 174 to the third groove 172 and defining a third feeding path for the third material. The feeder system 100 further includes a third suction head 180 having a first end connected to the third groove 172 and a second end connected to the mixer unit 106. Herein, the first end includes tapered geometry for powder extraction. The feeder system 100 further includes a third motor 182 configured to rotate the third wheel 170 so that the third material is transferred from the third hopper 174 to the third groove 172 via the third conduit 178 and then to the mixer unit 106 via the third suction head 180. Herein, the third motor 182 connects to the third wheel 170 through a third wheel disc

184, enabling controlled wheel rotation for powder material transport from the third hopper 174 to the mixer unit 106. In this configuration of the feeder system 100, the mixer unit 106 is configured to mix the first material, the second material and the third material.

In some embodiments, the first wheel 110, the second wheel 130 and the third wheel 170 are co-axial. Specifically, the main shaft 150 of the feeder system 100 extends through central axes of all three wheels, maintaining coaxial alignment of the first wheel 110, the second wheel 130, and the third wheel 170. This vertical arrangement positions the first wheel 110 above the second wheel 130, which is positioned above the third wheel 170. Further, herein, the first wheel 110 is positioned above the second wheel 130 which is positioned above the third wheel 170; and the first wheel 110 has a smaller circumference than the second wheel 130 which has a smaller circumference than the third wheel 170. That is, the wheels 110, 130, 170 implement progressively increasing circumferential dimensions, in which the first wheel 110 maintains smaller circumference than the second wheel 130, which maintains smaller circumference than the third wheel 170. This nested arrangement enables compact integration of three independent powder transport paths while maintaining spacing between adjacent wheels for interference-free rotation.

During operation of the feeder system 100, the third wheel 170, the first wheel 110 and the second wheel 130 can operate independently to enable simultaneous transport of three distinct powder materials. The third screw feeder 176 operates at independently controlled rotational speed to regulate powder flow from the third hopper 174 into the third groove 172. The third motor 182 drives rotation of the third wheel 170 through the third wheel disc 184, transporting powder material to position of the third suction head 180. The vacuum-driven powder extraction through the third suction head 180 enables material transport to the mixer unit 106, where mixing of three powder materials generates mixtures with controlled compositional characteristics based on the regulated material flow rates from wheels and screw feeders of the feeder system 100.

In particular, during operation of the feeder system 100, the first hopper 114, the second hopper 134, and the third hopper 174 receive designated powder materials for processing. Each hopper includes an integrated screw feeder wherein the first screw feeder 116 is incorporated within the first hopper 114, the second screw feeder 136 is incorporated within the second hopper 134, and the third screw feeder 176 is incorporated within the third hopper 174. The hoppers maintain fixed positions on the feeder system 100 while the first sensor 166, the second sensor 168, and corresponding weight measurement devices monitor material mass within each hopper. The first screw feeder 116, the second screw feeder 136, and the third screw feeder 176 independently operate at various rotational velocities through their respective motors, enabling measured powder material deposition into the first groove 112, the second groove 132, and the third groove 172 respectively.

As each wheel rotates with contained powder material, the bulk density of the powder material within each groove is calculated according to the following equation:

Bulk density=mass of powder material/volume of groove

The bulk density calculation includes mass measurements from the weight sensors and known volumetric parameters of the grooves. This calculated bulk density, combined with measured rotational speeds and groove volumes, enables determination of powder material flow rates through the first suction head 120, the second suction head 140, and the third suction head 180 without requiring separate calibration procedures for different materials. That is, there is no need for additional experimentation to measure the material flow rate at various rotation speed of the disc or change in material. The suction heads connect to the mixer unit 106, wherein vacuum pressure generates controlled material transport to the mixer unit 106.

The feeder system 100 includes computer-based control systems (as discussed later in reference to FIGS. 2-5) that maintain real-time regulation of motor speeds including the first motor 122, the second motor 142, the third motor 182, the first screw motor 162, the second screw motor 164 and the like. This coordinated control enables adjustment of powder material composition through independent regulation of screw feeder and wheel rotational speeds. Such control capabilities of the feeder system 100 enable implementation in functionally graded material manufacturing processes including Laser Direct Energy Deposition additive manufacturing applications where controlled material composition gradients are required.

It may be appreciated that the illustrations of the present disclosure depict the feeder system 100 incorporating the first wheel 110, the second wheel 130, and the third wheel 170. However, the feeder system 100 maintains operational capabilities with various wheel configurations including implementation with only the first wheel 110 and the second wheel 130, or configurations incorporating four or more wheels arranged in the coaxial configuration. The reduced operational requirement includes the first wheel 110 and the second wheel 130 maintained in the coaxial arrangement along the main shaft 150, enabling basic two-material processing capabilities. The scope and the spirit of the present disclosure encompasses any number of wheels arranged in the coaxial configuration while maintaining various geometric relationships, material transport mechanisms, and operational parameters described herein.

The feeder system 100 of the present disclosure maintains operational compatibility with multiple powder processing applications including powder-based Additive Manufacturing processes. The coaxial arrangement of multiple powder transport mechanisms enables flow rate control and material composition adjustment required in Laser Direct Energy Deposition (LDED) processes. The compact dimensional characteristics and real-time monitoring capabilities of the feeder system 100 further enable implementation in pharmaceutical manufacturing operations where controlled powder mixing and compositional control are required. The feeder system 100 includes vacuum-driven powder transport mechanisms and integrated measurement capabilities that maintain applicability across diverse powder processing requirements including metal powder, ceramic powder, and polymer powder applications.

The feeder system 100 of the present disclosure represents advancement in powder material processing through implementation of multiple material handling mechanisms in a compact coaxial configuration. The integration of multiple powder transport paths within a unified framework enables simultaneous processing of multiple materials while maintaining independent control over individual material parameters. The incorporation of real-time weight measurement capabilities eliminates requirements for separate calibration procedures while enabling direct calculation of material flow rates during operation. The feeder system 100 provides multiple advantages over conventional powder feeding mechanisms through implementation of the coaxial wheel arrangement. This configuration reduces spatial requirements compared to individual disc arrangements while maintaining independent control over multiple powder materials. The incorporation of both screw feeder and rotating disc mechanisms enables wide range flow rate control without requiring separate calibration procedures for different materials. The real-time weight measurement capabilities and vacuum-driven material transport enable composition control required for functionally graded material applications while maintaining operational efficiency through the compact mechanical arrangement.

Figure 2:
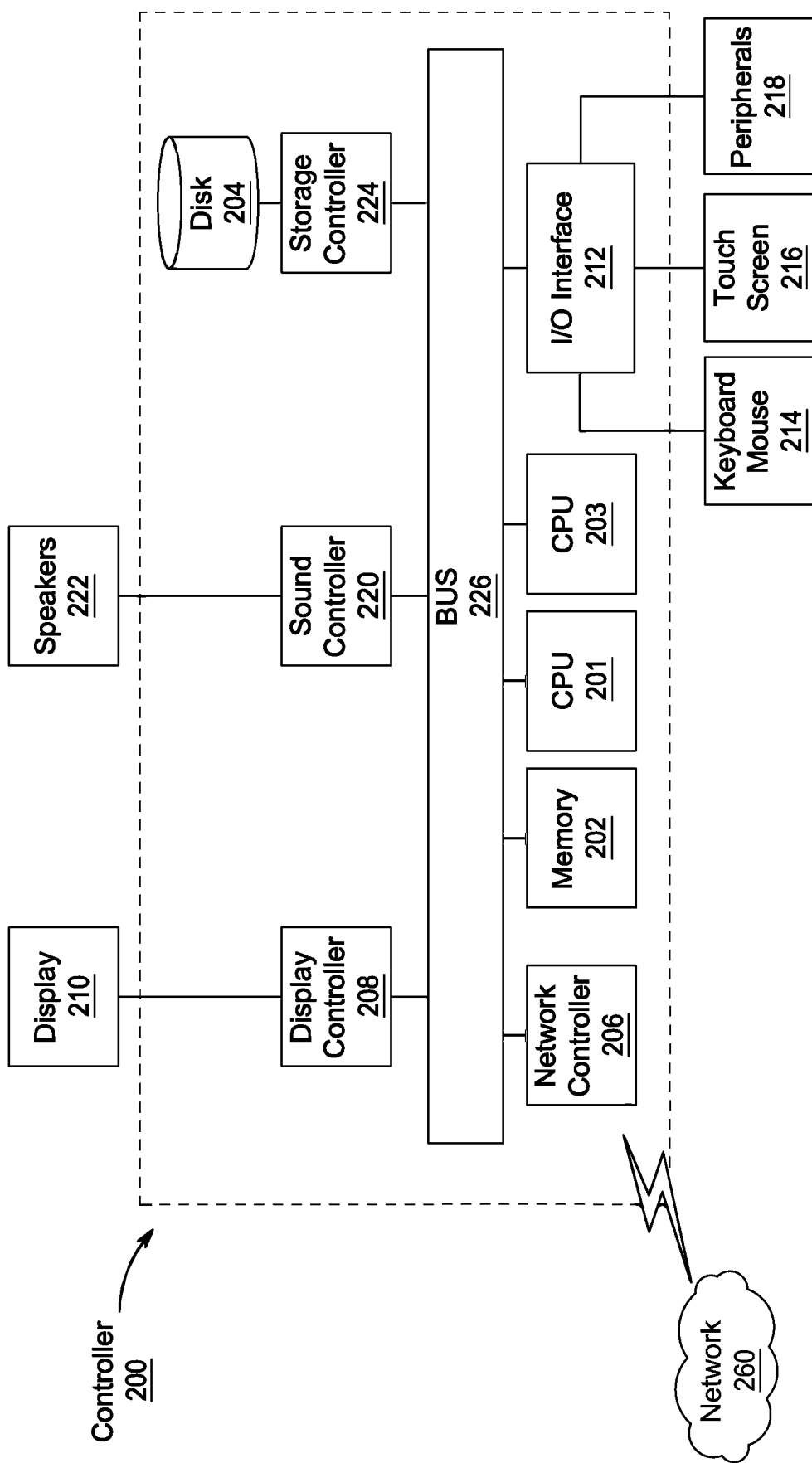
FIG. 2 is an illustration of a non-limiting example of details of computing hardware used in the computing system, according to certain embodiments.

Next, further details of the hardware description of a computing environment according to exemplary embodiments is described with reference to FIG. 2. In FIG. 2, a controller 200 is described is representative of the computer-based control systems for the feeder system 100 to control operations of various electrical components therein, in which the controller 200 is a computing device which includes a CPU 201 which performs the processes described above/below. The process data and instructions may be stored in memory 202. These processes and instructions may also be stored on a storage medium disk 204 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 201, 203 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 201 or CPU 203 may be a Xenon or Core processor from Intel of America or an Opteron processor from AMD of America, or may be other processor types that would be recognized by one of ordinary skill in the art. Alternatively, the CPU 201, 203 may be implemented on an FPGA, ASIC, PLD or using discrete logic circuits, as one of ordinary skill in the art would recognize. Further, CPU 201, 203 may be implemented as multiple processors cooperatively working in parallel to perform the instructions of the inventive processes described above.

The computing device in FIG. 2 also includes a network controller 206, such as an Intel Ethernet PRO network interface card from Intel Corporation of America, for interfacing with network 260. As can be appreciated, the network 260 can be a public network, such as the Internet, or a private network such as an LAN or WAN network, or any combination thereof and can also include PSTN or ISDN sub-networks. The network 260 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 208, such as a NVIDIA GeForce GTX or Quadro graphics adaptor from NVIDIA Corporation of America for interfacing with display 210, such as a Hewlett Packard HPL 2445w LCD monitor. A general purpose I/O interface 212 interfaces with a keyboard and/or mouse 214 as well as a touch screen panel 216 on or separate from display 210. General purpose I/O interface also connects to a variety of peripherals 218 including printers and scanners, such as an OfficeJet or DeskJet from Hewlett Packard.

A sound controller 220 is also provided in the computing device such as Sound Blaster X-Fi Titanium from Creative, to interface with speakers/microphone 222 thereby providing sounds and/or music.

The general purpose storage controller 224 connects the storage medium disk 204 with communication bus 226, which may be an ISA, EISA, VESA, PCI, or similar, for interconnecting all of the components of the computing device. A description of the general features and functionality of the display 210, keyboard and/or mouse 214, as well as the display controller 208, storage controller 224, network controller 206, sound controller 220, and general purpose I/O interface 212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 3.

Figure 3:
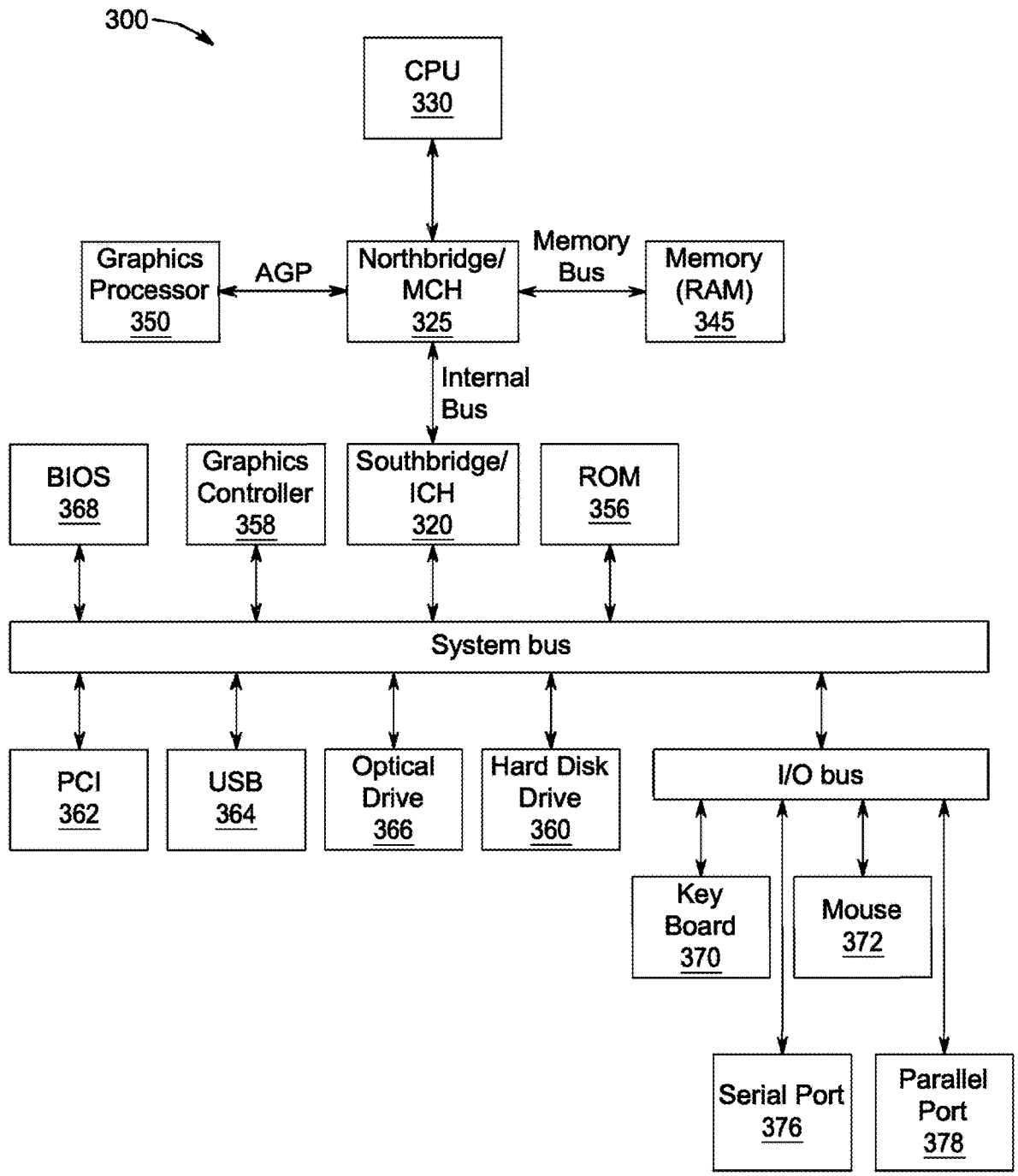
FIG. 3 is an exemplary schematic diagram of a data processing system used within the computing system, according to certain embodiments.

FIG. 3 shows a schematic diagram of a data processing system, according to certain embodiments, for performing the functions of the exemplary embodiments. The data processing system is an example of a computer in which code or instructions implementing the processes of the illustrative embodiments may be located.

In FIG. 3, data processing system 300 employs a hub architecture including a north bridge and memory controller hub (NB/MCH) 325 and a south bridge and input/output (I/O) controller hub (SB/ICH) 320. The central processing unit (CPU) 330 is connected to NB/MCH 325. The NB/MCH 325 also connects to the memory 345 via a memory bus, and connects to the graphics processor 350 via an accelerated graphics port (AGP). The NB/MCH 325 also connects to the SB/ICH 320 via an internal bus (e.g., a unified media interface or a direct media interface). The CPU Processing unit 330 may contain one or more processors and even may be implemented using one or more heterogeneous processor systems.

Figure 4:
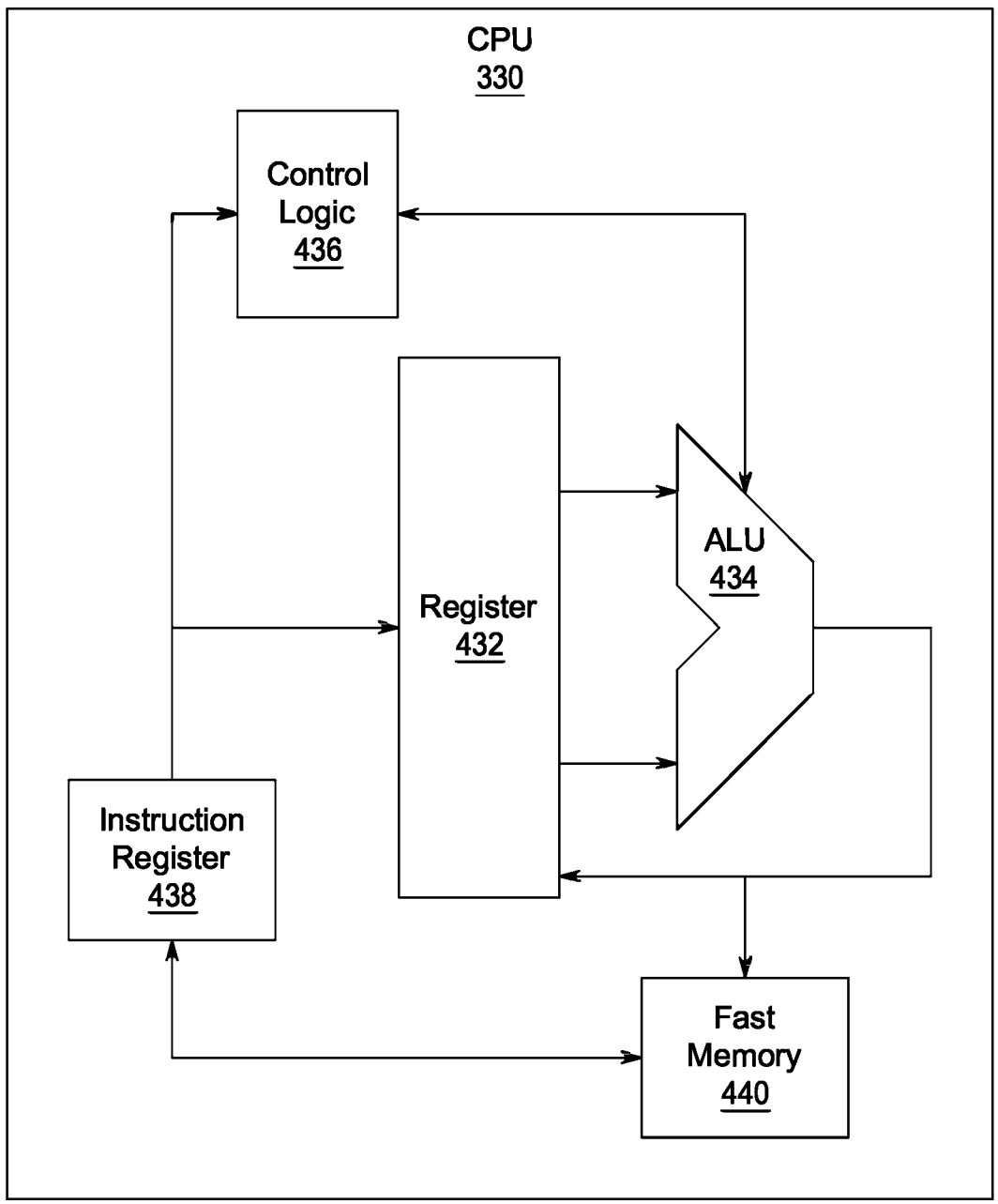
FIG. 4 is an exemplary schematic diagram of a processor used with the computing system, according to certain embodiments.

For example, FIG. 4 shows one implementation of CPU 330. In one implementation, the instruction register 438 retrieves instructions from the fast memory 440. At least part of these instructions are fetched from the instruction register 438 by the control logic 436 and interpreted according to the instruction set architecture of the CPU 330. Part of the instructions can also be directed to the register 432. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 434 that loads values from the register 432 and performs logical and mathematical operations on the loaded values according to the instructions. The results from these operations can be feedback into the register and/or stored in the fast memory 440. According to certain implementations, the instruction set architecture of the CPU 330 can use a reduced instruction set architecture, a complex instruction set architecture, a vector processor architecture, a very large instruction word architecture. Furthermore, the CPU 330 can be based on the Von Neuman model or the Harvard model. The CPU 330 can be a digital signal processor, an FPGA, an ASIC, a PLA, a PLD, or a CPLD. Further, the CPU 330 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 3, the data processing system 300 can include that the SB/ICH 320 is coupled through a system bus to an I/O Bus, a read only memory (ROM) 356, universal serial bus (USB) port 364, a flash binary input/output system (BIOS) 368, and a graphics controller 358. PCI/PCIe devices can also be coupled to SB/ICH 388 through a PCI bus 362.

The PCI devices may include, for example, Ethernet adapters, add-in cards, and PC cards for notebook computers. The Hard disk drive 360 and CD-ROM 366 can use, for example, an integrated drive electronics (IDE) or serial advanced technology attachment (SA TA) interface. In one implementation the I/O bus can include a super I/O (SIO) device.

Further, the hard disk drive (HDD) 360 and optical drive 366 can also be coupled to the SB/ICH 320 through a system bus. In one implementation, a keyboard 370, a mouse 372, a parallel port 378, and a serial port 376 can be connected to the system bus through the I/O bus. Other peripherals and devices that can be connected to the SB/ICH 320 using a mass storage controller such as SATA or PATA, an Ethernet port, an ISA bus, a LPC bridge, SM Bus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 5:
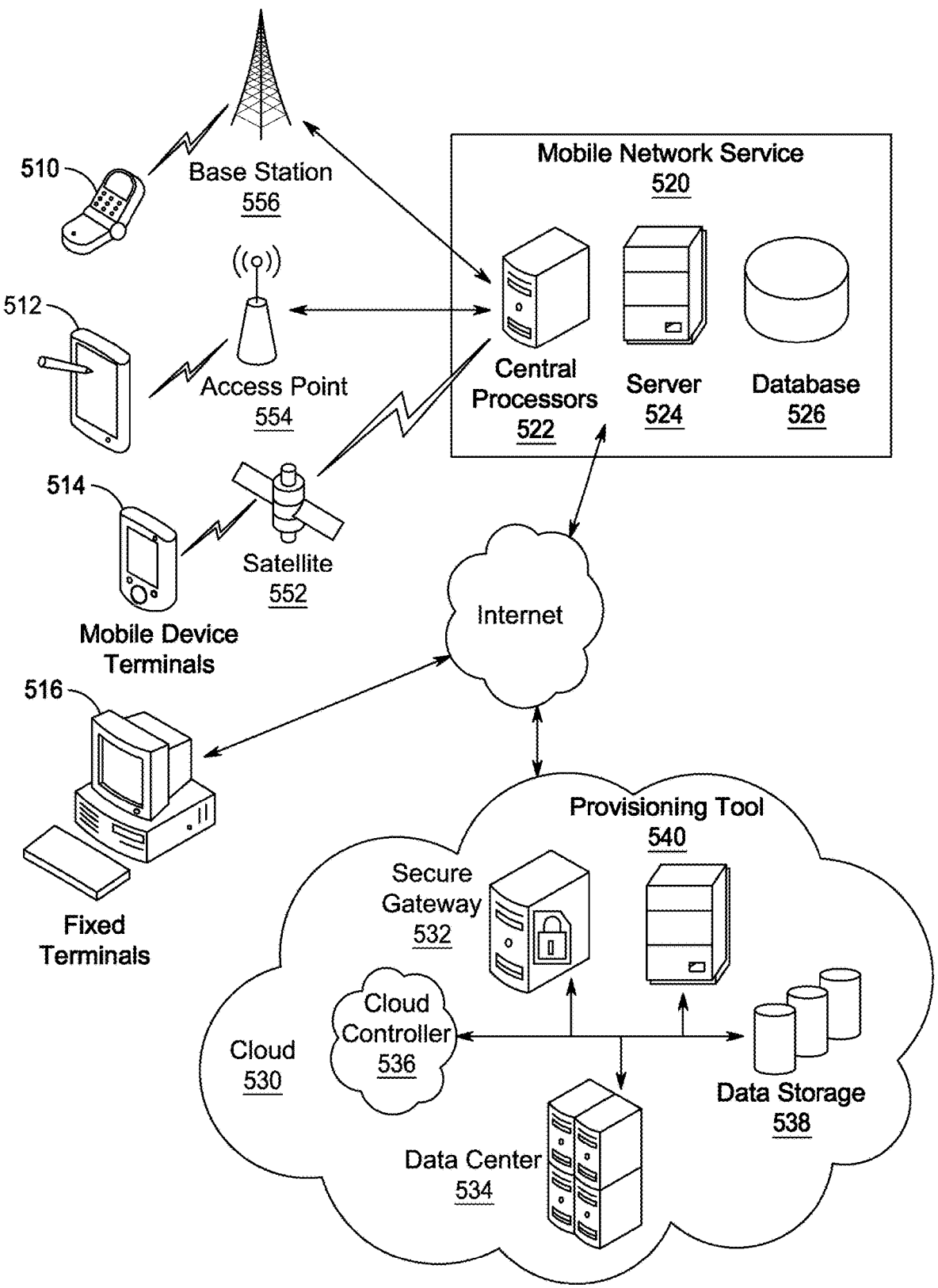
FIG. 5 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 530 including a cloud controller 536, a secure gateway 532, a data center 534, data storage 538 and a provisioning tool 540, and mobile network services 520 including central processors 522, a server 524 and a database 526, which may share processing, as shown by FIG. 5, in addition to various human interface and communication devices (e.g., display monitors 516, smart phones 510, tablets 512, personal digital assistants (PDAs) 514). The network may be a private network, such as a LAN, satellite 552 or WAN 554, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

While specific embodiments of the invention have been described, it should be understood that various modifications and alternatives may be implemented without departing from the spirit and scope of the invention. For example, different cellular automata rules or encryption algorithms could be employed, or alternative feature extraction and face recognition techniques could be integrated into the system.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A multi-disc feeder system, comprising:
   a first wheel that is donut-ring-shaped and has a first groove recessed below a top surface of the first wheel, wherein the first wheel has a flat top surface and the groove has a flat bottom surface;
   a first hopper positioned above the first wheel and configured to receive a first material;
   a first conduit connecting a bottom of the first hopper to the first groove and defining a first feeding path for the first material;
   a mixer unit;
   a first suction head having a first end connected to the first groove and a second end connected to the mixer unit;
   a first motor configured to rotate the first wheel so that the first material is transferred from the first hopper to the first groove via the first conduit and then to the mixer unit via the first suction head;
   a second wheel that is donut-ring-shaped and has a second groove recessed below a top surface of the second wheel;
   a second hopper positioned above the second wheel and configured to receive a second material;
   a second conduit connecting a bottom of the second hopper to the second groove and defining a second feeding path for the second material;
   a second suction head having a first end connected to the second groove and a second end connected to the mixer unit; and
   a second motor configured to rotate the second wheel so that the second material is transferred from the second hopper to the second groove via the second conduit and then to the mixer unit via the second suction head, wherein
   the mixer unit is configured to mix the first material and the second material.

2. The feeder system of claim 1, further comprising:
   a shaft extending through a center of the first wheel and a center of the second wheel, wherein the first wheel and the second wheel are co-axial.

3. The feeder system of claim 2, wherein:
   the first wheel is positioned above the second wheel, and the first wheel has a smaller circumference than the second wheel.

4. The feeder system of claim 3, wherein:
   the first groove surrounds an inner side surface of the first wheel by 360 degrees and is surrounded by an outer side surface of the first wheel by 360 degrees, and
   the second groove surrounds an inner side surface of the second wheel by 360 degrees and is surrounded by an outer side surface of the second wheel by 360 degrees.

5. The feeder system of claim 4, wherein:
   the first conduit and the first suction head are positioned at different angular positions of the first groove, and
   the second conduit and the second suction head are positioned at different angular positions of the second groove.

6. The feeder system of claim 5, wherein:
the first suction head and the second suction head are positioned at a same angular position relative to the shaft.
7. The feeder system of claim 6, wherein:
the first groove is ring-shaped, and
the second groove is ring-shaped.
8. The feeder system of claim 4, wherein:
when viewed along the shaft, the outer side surface of the first wheel is surrounded by the inner side surface of the second wheel by 360 degrees.
9. The feeder system of claim 8, wherein:
when viewed along the shaft, the outer side surface of the first wheel is spaced apart from the inner side surface of the second wheel.
10. The feeder system of claim 4, wherein:
the first groove defines a first continuous ring-shaped space to receive the first material, and
the second groove defines a second continuous ring-shaped space to receive the second material.
11. The feeder system of claim 3, wherein:
the first suction head is shorter than the second suction head.
12. The feeder system of claim 1, wherein:
the first end of the first suction head is tapered and is positioned in the first groove, and
the first end of the second suction head is tapered and is positioned in the second groove.
13. The feeder system of claim 1, further comprising a vacuum pump including:
a first flow line connecting the second end of the first suction head to the mixer unit; and
a second flow line connecting the second end of the second suction head to the mixer unit.
14. The feeder system of claim 1, wherein:
the first hopper comprises a first screw feeder, and
the second hopper comprises a second screw feeder.
15. The feeder system of claim 14, further comprising:
a first screw motor configured to rotate the first screw feeder; and
a second screw motor configured to rotate the second screw feeder.
16. The feeder system of claim 15, wherein:
the first screw motor is configured to rotate the first screw feeder at a different speed from the first wheel, and
the second screw motor is configured to rotate the second screw feeder at a different speed from the second wheel.

17. The feeder system of claim 1, further comprising:
a first sensor positioned below the first hopper and configured to measure a weight of the first hopper and the first material therein; and
a second sensor positioned below the second hopper and configured to measure a weight of the second hopper and the second material therein.
18. The feeder system of claim 1, further comprising:
a first wheel disc that is in direct contact with the first wheel; and
a second wheel disc that is in direct contact with the second wheel, wherein
the first motor is configured to rotate the first wheel by rotating the first wheel disc which rotates the first wheel, and
the second motor is configured to rotate the second wheel by rotating the second wheel disc which rotates the second wheel.
19. The feeder system of claim 1, further comprising:
a third wheel that is donut-ring-shaped and has a third groove recessed below a top surface of the third wheel;
a third hopper positioned above the third wheel and configured to receive a third material;
a third conduit connecting a bottom of the third hopper to the third groove and defining a third feeding path for the third material;
a third suction head having a first end connected to the third groove and a second end connected to the mixer unit; and
a third motor configured to rotate the third wheel so that the third material is transferred from the third hopper to the third groove via the third conduit and then to the mixer unit via the third suction head, wherein
the mixer unit is configured to mix the first material, the second material and the third material.
20. The feeder system of claim 19, further comprising:
a shaft extending through a center of the first wheel and a center of the second wheel, wherein
the first wheel, the second wheel and the third wheel are co-axial,
the first wheel is positioned above the second wheel which is positioned above the third wheel, and
the first wheel has a smaller circumference than the second wheel which has a smaller circumference than the third wheel.

* * * * *